(12) United States Patent
Terashima

(10) Patent No.: US 12,001,737 B2
(45) Date of Patent: Jun. 4, 2024

(54) IMAGE FORMING APPARATUS, CLOUD SYSTEM, CONTROL METHOD, AND NON-TRANSITORY STORAGE MEDIUM

(71) Applicant: CANON KABUSHIKI KAISHA, Tokyo (JP)

(72) Inventor: Yuto Terashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/158,728

(22) Filed: Jan. 24, 2023

(65) Prior Publication Data

US 2023/0244427 A1  Aug. 3, 2023

(30) Foreign Application Priority Data

Jan. 28, 2022  (JP) .................................. 2022-011483

(51) Int. Cl.
*G06F 3/12* (2006.01)

(52) U.S. Cl.
CPC .......... *G06F 3/1238* (2013.01); *G06F 3/1204* (2013.01); *G06F 3/1288* (2013.01)

(58) Field of Classification Search
CPC ..... G06F 3/1238; G06F 3/1204; G06F 3/1288

USPC ....................................... 358/1.14, 1.15, 1.9
See application file for complete search history.

(56) References Cited

U.S. PATENT DOCUMENTS

2016/0191727 A1\* 6/2016 Kimura ................ H04N 1/0083
   358/474
2019/0129669 A1\* 5/2019 Takahashi ............. G06F 3/1271

FOREIGN PATENT DOCUMENTS

JP            2020003877 A     1/2020

\* cited by examiner

*Primary Examiner* — Quang N Vo
(74) *Attorney, Agent, or Firm* — Canon U.S.A., Inc. IP Division

(57) ABSTRACT

An image forming apparatus configured to communicate with a first cloud cooperation system receives selection of a file stored in a cloud storage service, acquires the selected file via the first cloud cooperation system, performs control to execute printing of the acquired file, receives input of authentication information to be used for connection to a second cloud cooperation system different from the first cloud cooperation system, and transmits information about a result of the executed printing to the second cloud cooperation system via the first cloud cooperation system by using the input authentication information.

8 Claims, 10 Drawing Sheets

ENTER INFORMATION ABOUT TENANT
TO BE CONNECTED

URL
ID
PASSWORD

THIS STORAGE IS ALREADY CONNECTED TO TENANT A.

PLEASE ENTER INFORMATION ABOUT TENANT A FOR INFORMATION MANAGEMENT

| | |
|---|---|
| URL | https://tenantA.com |
| ID | |
| PASSWORD | |

IMAGE FORMING APPARATUS, CLOUD SYSTEM, CONTROL METHOD, AND NON-TRANSITORY STORAGE MEDIUM

BACKGROUND

Field

The present disclosure relates to a cloud print system that executes printing of documents stored in a cloud storage on a network.

Description of the Related Art

A cloud print service (CPS) in which a print job is input via a cloud and is transmitted to an image forming apparatus has begun to spread. In such a print system, an administrator initially registers an image forming apparatus with a tenant of a CPS to which the administrator belongs. The administrator sets which users among those belonging to the tenant are given the permission for the use of the image forming apparatus. Here, "tenant" means a system which is deployed on a cloud and associated with a plurality of users and device(s) as a single group. The tenant has a storage area to be accessed only by the users who belong to this single group. For example, in a company tenant A of a CPS used by a certain company A, employees who work for the company A are registered as users, and image forming apparatus(es) of the company A are registered and used.

In this way, if a user of the company A performs printing by using an in-house terminal, the user can freely perform printing by using any image forming apparatus in the office of the company A.

As working styles diversify, there are cases in which a user wishes to print a document stored in an in-house client terminal by using an external image forming apparatus disposed outside the office (e.g., an image forming apparatus in a shared office). In such a case, typically, the user transmits a document from an in-house client terminal to a cloud storage service and stores the document in the cloud storage service. The user then accesses the cloud storage service from an image forming apparatus outside the office when out of the office, download the document from the cloud storage service, and print the document.

According to Japanese Patent Application Laid-Open No. 2020-3877, when a user selects a cloud service A and when authentication cooperation information about the user is not stored, an image forming apparatus displays a screen for inputting information about an external user of the cloud service A. In addition, when the user inputs information on the input screen, an authentication request is transmitted to the cloud service A.

SUMMARY

According to embodiments of the present disclosure, an image forming apparatus configured to communicate with a first cloud cooperation system includes at least one memory that stores instructions, and at least one processor. The at least one processor executes the instructions to receive selection of a file stored in a cloud storage service, acquire the selected file via the first cloud cooperation system, perform control to execute printing of the acquired file, receive input of authentication information to be used for connection to a second cloud cooperation system different from the first cloud cooperation system, and transmit information about a result of the executed printing to the second cloud cooperation system via the first cloud cooperation system by using the input authentication information.

Further features of the present disclosure will become apparent from the following description of exemplary embodiments with reference to the attached drawings.

BRIEF DESCRIPTION OF THE DRAWINGS

FIG. 7 is a diagram illustrating an example of a tenant information input user interface (UI).

FIG. 8 is a diagram illustrating an example of a certain tenant information input UI.

DESCRIPTION OF THE EMBODIMENTS

Hereinafter, suitable modes for carrying out the present disclosure will be described with reference to accompanying drawings. The following exemplary embodiments do not limit the present disclosure, and not all the combinations of features described in the exemplary embodiments are essential to the solution of the present disclosure.

<System Configuration>

Figure 1:
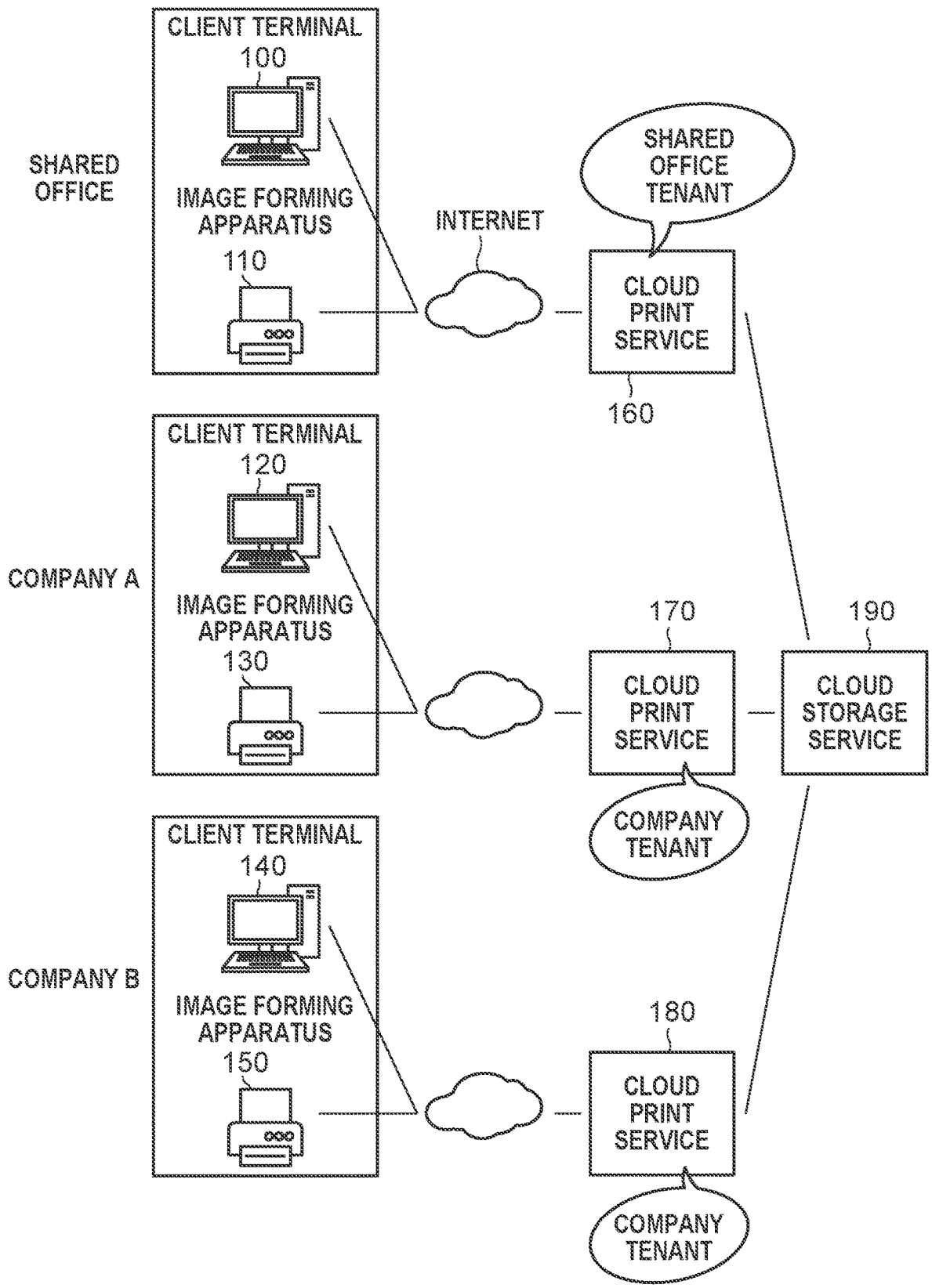
FIG. 1 is a diagram illustrating an example of a system configuration in which cooperation with cloud print services is performed.

FIG. 1 illustrates an example of a cloud system configuration according to an exemplary embodiment.

A client terminal 100 and an image forming apparatus 110 are disposed in a shared office. A client terminal 120 and an image forming apparatus 130 are disposed in a company A, and a client terminal 140 and an image forming apparatus 150 are disposed in a company B. A cloud print service (CPS) 160 is managed by an administrator of the shared office, and a tenant assigned to this CPS 160 is defined as a shared office tenant. CPSs 170 and 180 are managed by the companies A and B, respectively, and tenants assigned to the CPSs 170 and 180 are defined as their respective company tenants. These CPSs 160, 170, and 180 are each connected to a cloud storage service 190.

The client terminals 100, 120, and 140 input print jobs to the CPSs 160, 170, and 180, respectively.

The image forming apparatuses 110, 130, and 150 acquire print jobs from the corresponding CPS and perform print processing.

The CPSs 160, 170, and 180 are cloud cooperation systems that receive print jobs from the client terminals 100, 120, and 140, respectively, and that exchange files with the cloud storage service 190.

The client terminal 100 and the image forming apparatus 110 disposed in the shared office are registered in the CPS 160 having the shared office tenant. In addition, the client terminal 120 and the image forming apparatus 130 disposed in the company A are registered in the CPS 170 having the company tenant for the company A. The client terminal 140 and the image forming apparatus 150 disposed in the company B are registered in the CPS 180 having the company tenant for the company B. The CPSs 160, 170, 180 can each be connected to the cloud storage service 190 in accordance with an authentication and authorization sequence illustrated in FIG. 4. The following description will be provided assuming that a user has generated a user account of the cloud storage service 190.

Figure 4:
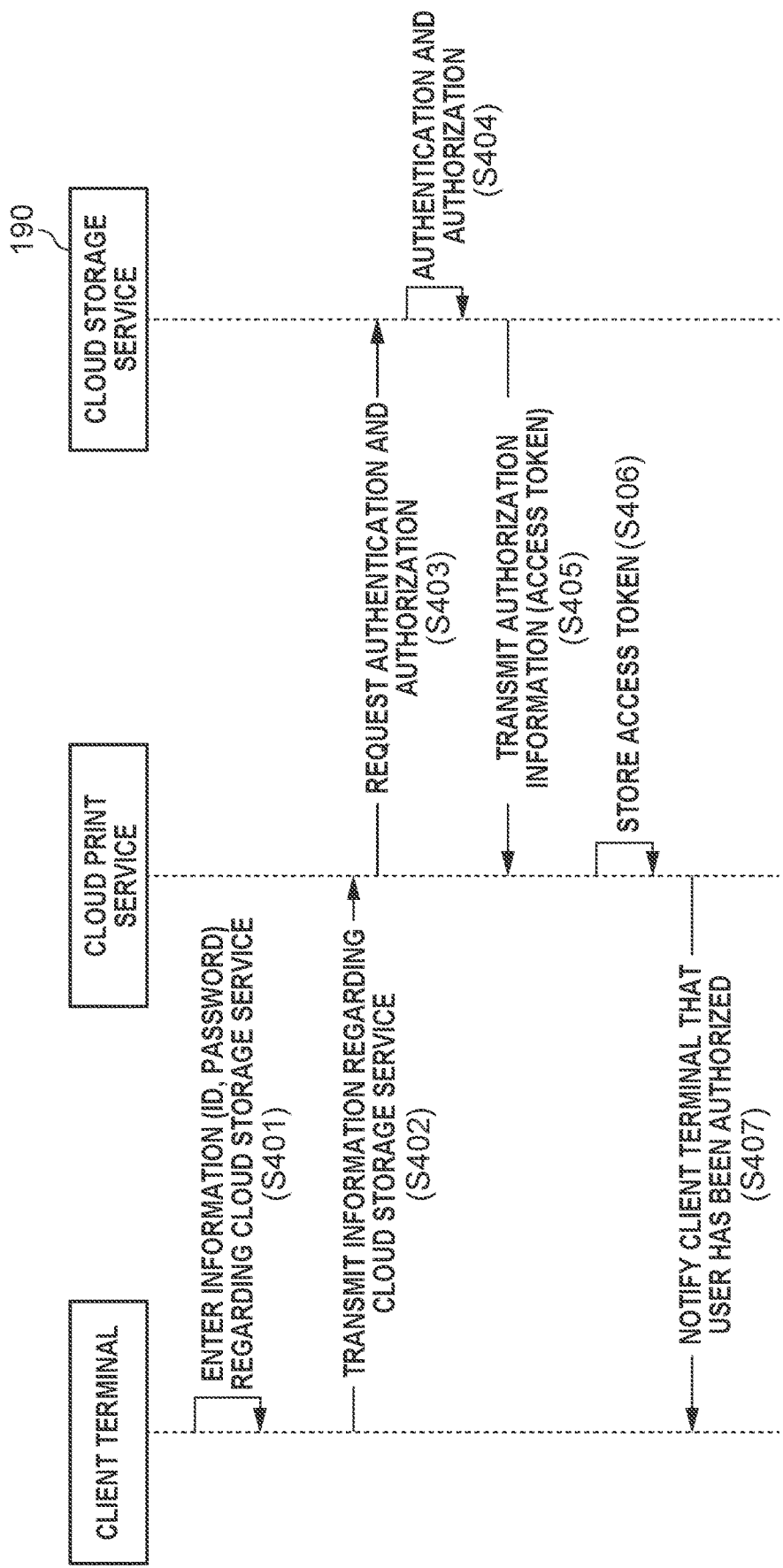
FIG. 4 is a sequence diagram illustrating connection between the cloud print service and a cloud storage service based on authentication and authorization.

Hereinafter, the authentication and authorization sequence in FIG. 4 will be described. The following description will be provided based on an example in which a user of the company A connects the client terminal 120 of the company A to the cloud storage service 190 via the CPS 170. A similar authentication and authorization sequence is applied to connection of the client terminal or the image forming apparatus in the shared office or the company B to the cloud storage service 190 via the corresponding CPS.

Initially, in step S401, the user enters information (e.g., a login ID and a login password) regarding the cloud storage service 190 by operating the client terminal 120. Next in step S402, the client terminal 120 transmits the information to the CPS 170. In step S403, a communication unit 303 of the CPS 170 transmits the received information to the cloud storage service 190. In step S404, based on the received information, an authentication control unit 1003 of the cloud storage service 190 performs authentication and authorization processing. If the authorization is successful, in step S405, a communication unit 1001 of the cloud storage service 190 transmits authorization information (an access token) to the CPS 170. In step S406, the CPS 170 stores the received access token in a data storage unit 305. In step S407, the CPS 170 notifies the client terminal 120 that the user has been authorized. The CPS 170 and the cloud storage service 190 are connected to each other through such an authentication and authorization procedure. Thus, data is exchangeable between the CPS 170 and the cloud storage service 190.

The individual constituent elements are connected to communicate with each other via a network. The network is, for example, any one of the Internet, a local area network (LAN), a wide area network (WAN), a telephone line, a dedicated digital line, and an asynchronous transfer mode (ATM). Alternatively, the network is a communication network realized by a combination of at least two of the above examples.

In the present exemplary embodiment, the CPS 160 has been described as a shared office tenant, and the CPSs 170 and 180 have been described as company tenants, or as different CPSs. Alternatively, the CPS 170 or 180 may be configured to serve as the CPS 160. In other words, these CPSs may have the same configuration.

<Hardware Configuration>

Figure 2:
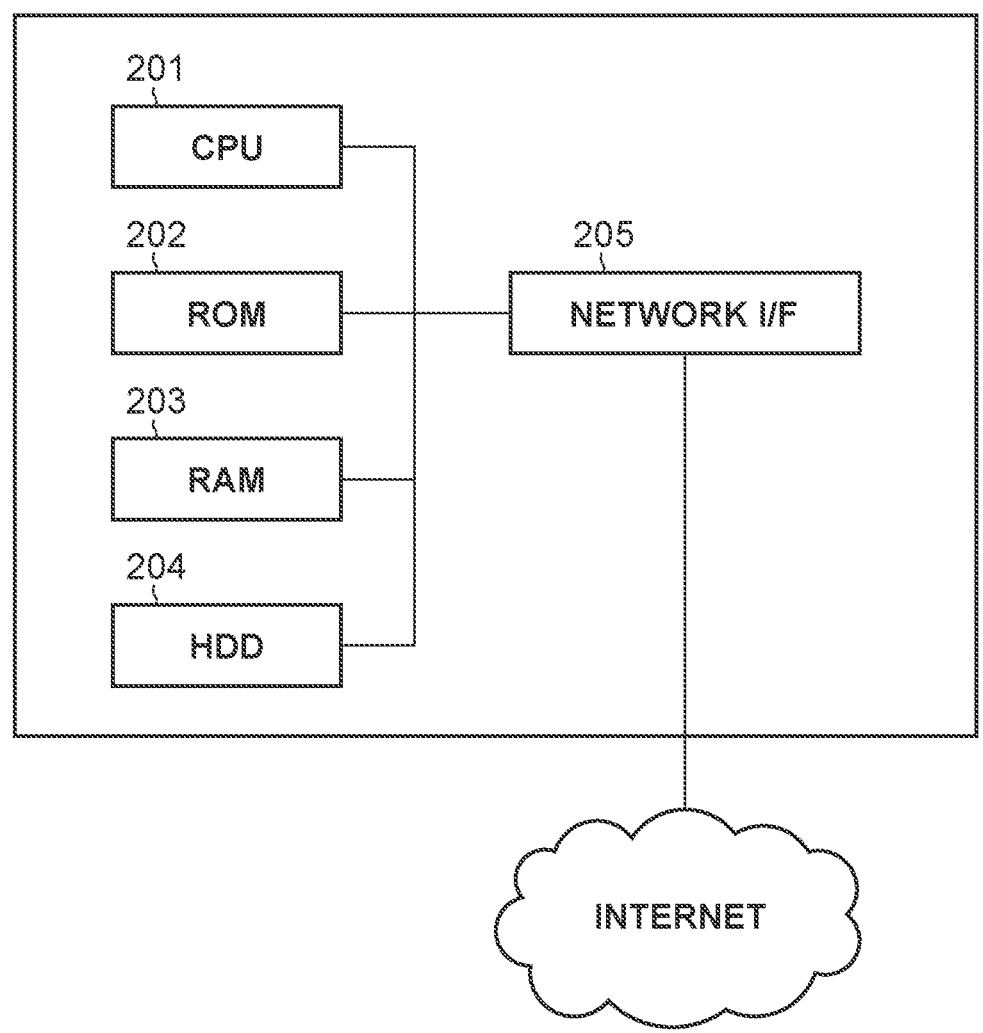
FIG. 2 is a diagram illustrating an example of a hardware configuration that executes a cloud print service.

FIG. 2 illustrates an example of a hardware configuration of an information processing apparatus. Examples of the information processing apparatus according to the present exemplary embodiment include a server computer in a data center where a CPS or a cloud storage service is established. A similar hardware configuration of a general information processing apparatus is applicable to the client terminals or the image forming apparatuses according to the present exemplary embodiment. The information processing apparatus may further include a component not illustrated in FIG. 2.

A central processing unit (CPU) 201 controls an overall operation by reading out a control program stored in a read-only memory (ROM) 202 and executing various types of processing.

A random access memory (RAM) 203 is used as a temporary storage area, such as a main memory or a work area, of the CPU 201.

A hard disk drive (HDD) 204 is a large-capacity storage unit that stores image data and various programs.

A network interface (I/F) 205 connects the CPS and the cloud storage service 190 via the Internet. The CPS and the cloud storage service 190 receive processing requests from the client terminals and the image forming apparatuses via the network I/F 205 and perform various types of processing, and exchange information.

<Software Configuration of CPS>

Figure 3:
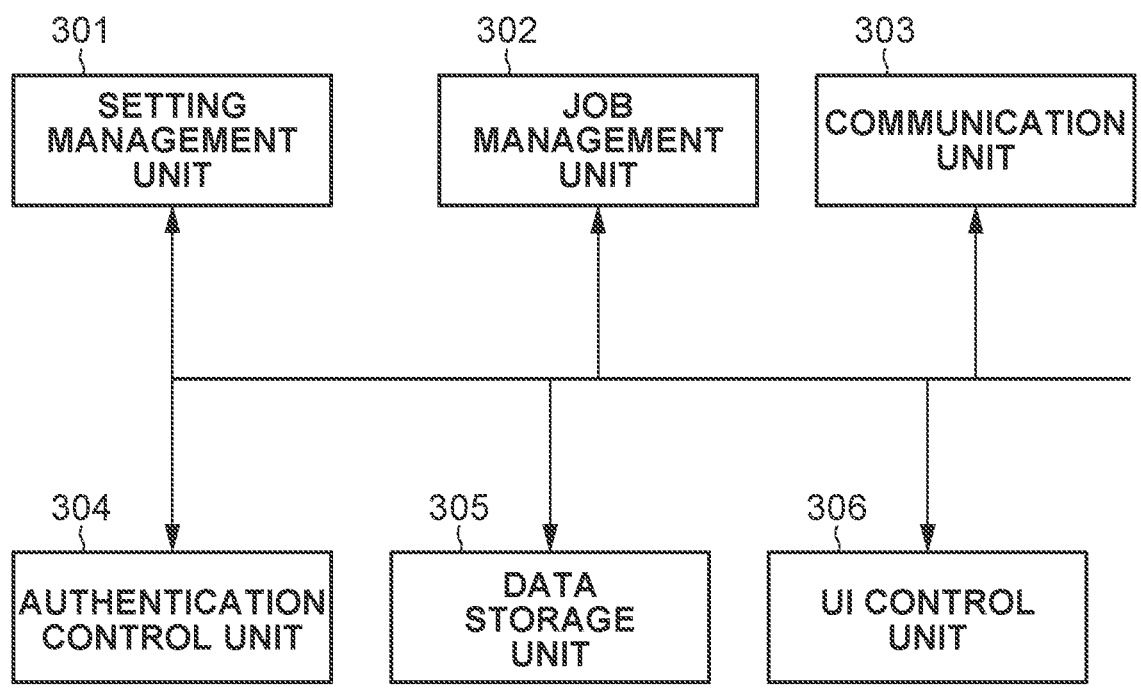
FIG. 3 is a diagram illustrating an example of a software configuration that executes the cloud print service.

FIG. 3 illustrates an example of a software configuration that executes the CPS. The software configuration illustrated in FIG. 3 is realized by the CPU 201 reading out a program stored in the ROM 202 to the RAM 203 and executing the read program, for example.

A setting management unit 301 stores settings relating to various functions of the CPS in a storage device, such as the RAM 203 and the HDD 204, and reads out the settings from the storage device. The settings are, for example, a tenant name and a tenant URL.

A job management unit 302 stores a print job received from the corresponding client terminal and information about the print job in the data storage unit 305.

The communication unit 303 communicates with the corresponding client terminal, the corresponding image forming apparatus, and the cloud storage service, receives various processing requests, and transmits processing results.

An authentication control unit 304 performs user management. User information added by an administrator of the corresponding company tenant is stored in the data storage unit 305 or a database (DB) (not illustrated) dedicated for user management.

Alternatively, the authentication control unit 304 may be configured to cooperate with an external authentication service.

The data storage unit 305 stores data in response to a request from the job management unit 302 or the authentication control unit 304.

A UI control unit 306 generates a screen in response to a request from the corresponding client terminal or the corresponding image forming apparatus and transmits the generated screen.

<Software Configuration of Cloud Storage Service>

Figure 10:
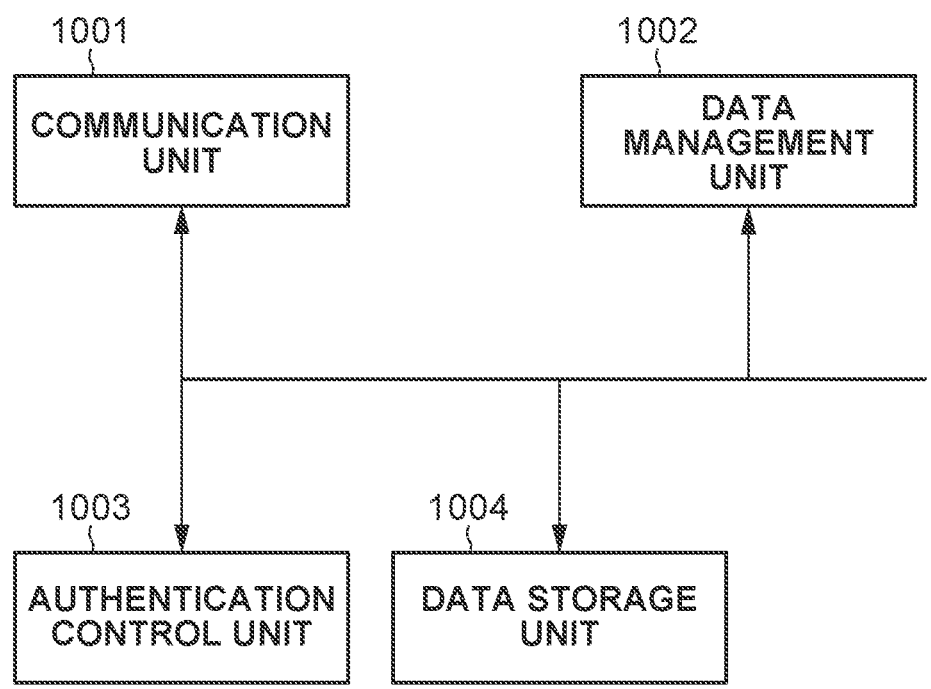
FIG. 10 is a diagram illustrating an example of a software configuration that executes the cloud storage service.

FIG. 10 illustrates a software configuration that executes the cloud storage service 190. The software configuration illustrated in FIG. 10 is realized by the CPU 201 reading out a program stored in the ROM 202 to the RAM 203 and executing the read program, for example.

A communication unit 1001 communicates with the CPSs, receives various processing requests, and transmits processing results.

A data management unit 1002 stores data received from the CPSs in a data storage unit 1004.

The authentication control unit 1003 performs user management. User information is stored in the data storage unit 305 or a DB (not illustrated) dedicated for user management. Alternatively, the authentication control unit 1003 may cooperate with an external authentication service.

The data storage unit 1004 stores data in response to a request from the data management unit 1002 or the authentication control unit 1003.

<Sequence of Transmission of Print Job Execution Result>

Figure 5:
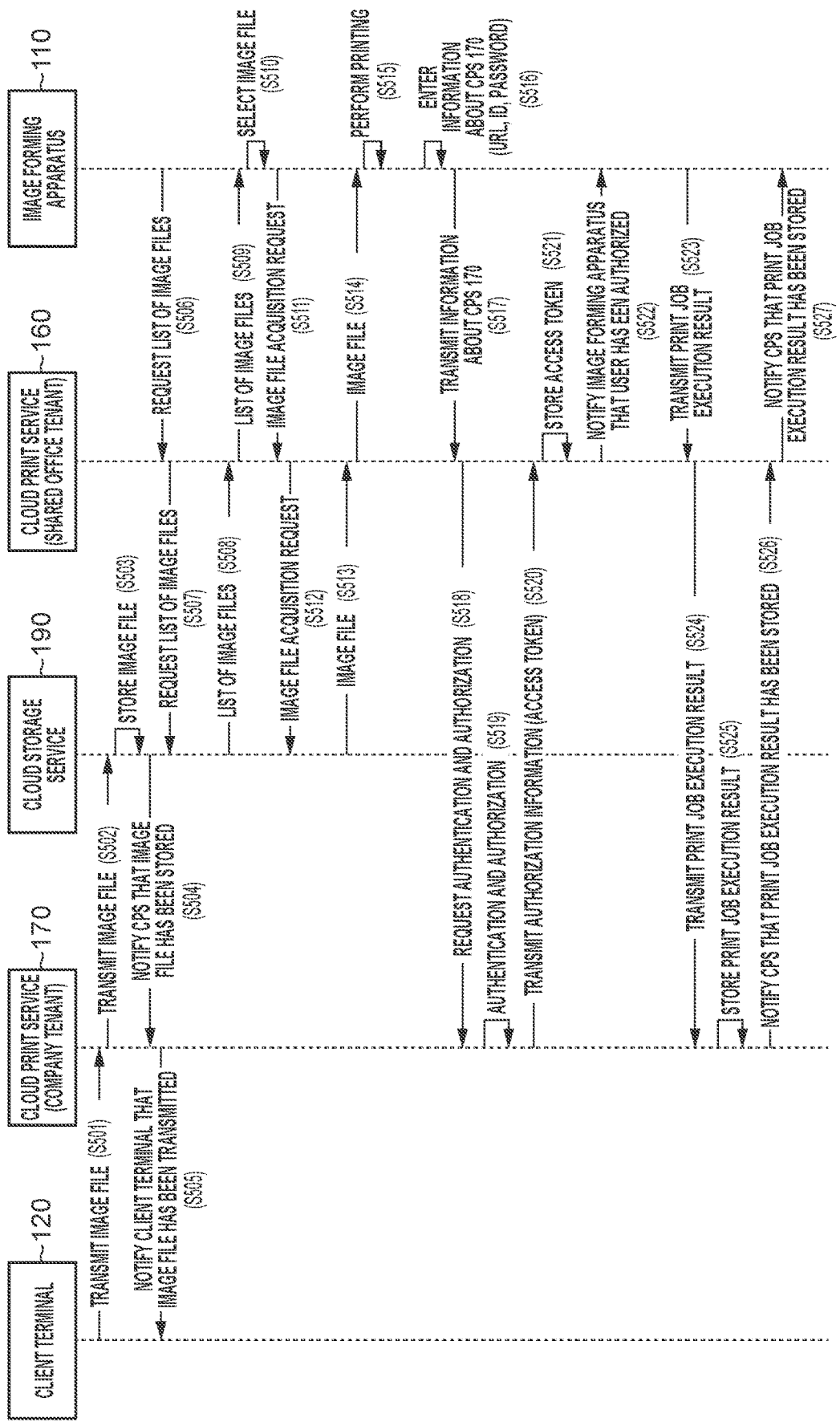
FIG. 5 is a sequence diagram illustrating transmission of a print job execution result.

FIG. 5 illustrates a sequence in which a user of the company A uploads a document in the client terminal 120 to the cloud storage service 190, prints the document with the image forming apparatus 110 in the shared office, and transmits a print job execution result to the CPS 170 having the company tenant of the company A. The CPSs 160 and 170 have been connected to the cloud storage service 190 in accordance with the authentication and authorization procedure illustrated in FIG. 4.

In step S501, the user transmits a document (e.g., an image file) in the client terminal 120 to the CPS 170.

In step S502, the communication unit 303 of the CPS 170 transmits the document to the cloud storage service 190.

In step S503, the data management unit 1002 of the cloud storage service 190 stores the document in the data storage unit 1004.

In step S504, the communication unit 1001 of the cloud storage service 190 notifies the CPS 170 that the document has been stored.

In step S505, the communication unit 303 of the CPS 170 notifies the client terminal 120 that the document has been transmitted.

A description will be provided of processing to be performed when the user goes out and prints the document stored in the cloud storage service 190 by using the image forming apparatus 110 in the shared office. According to the present exemplary embodiment, in a case where the user performs printing by using the image forming apparatus 110 in the shared office, information about the execution result of the print job (the number of printed sheets, information indicating whether the print job is color printing or monochrome printing, billing information, etc.) is manageable by the company tenant (CPS 170) of the company A through the following steps S506 to S527.

In step S506, the user operates the image forming apparatus 110 in the shared office to request the CPS 160 to acquire a list of documents (e.g., image files) of the user, stored in the cloud storage service 190. In this example, the user has selected the cloud storage service 190 on the operation panel of the image forming apparatus before the request for acquisition of a list of documents in step S506.

In step S507, the communication unit 303 of the CPS 160 requests the cloud storage service 190 to transmit the list of documents of the user stored in the cloud storage service 190.

In step S508, the communication unit 1001 of the cloud storage service 190 transmits the list of documents stored by the user to the CPS 160.

In step S509, the communication unit 303 of the CPS 160 transmits the list of documents to the image forming apparatus 110. The image forming apparatus 110 then displays the received list of documents on its display.

In step S510, the user selects a document (an image file) that the user wishes to print from the displayed list of documents.

In step S511, the image forming apparatus 110 transmits a request for acquisition of the document (the image file) selected by the user in step S510 to the CPS 160.

In step S512, the communication unit 303 of the CPS 160 transmits the received acquisition request to the cloud storage service 190.

In step S513, the communication unit 1001 of the cloud storage service 190 transmits the requested document (image file) to the CPS 160.

In step S514, the communication unit 303 of the CPS 160 transmits the received document (image file) to the image forming apparatus 110.

In step S515, the image forming apparatus 110 performs printing of the document (image file) received in step S514.

In step S516, the user enters information about the CPS as the destination of the print job execution result (information about the CPS 170 in this example). The user enters information about the CPS on a UI as illustrated in FIG. 7, for example. FIG. 7 illustrates an example of a tenant information input UI. On the input screen UI illustrated in FIG. 7, the user enters URL information for the connection destination CPS and authentication information (an ID and a password). The input screen may receive only the authentication information for the user. The URL information for the connection destination CPS may previously be managed by the CPS 160 or the like in association with the user information.

In step S517, the image forming apparatus 110 transmits the information entered by the user in step S516 to the CPS 160.

In step S518, the communication unit 303 of the CPS 160 transmits the received information to the CPS 170.

In step S519, the authentication control unit 304 of the CPS 170 performs authentication and authorization processing based on the received information.

In step S520, if the user has been authorized, the communication unit 303 of the CPS 170 transmits authorization information (an access token) to the CPS 160.

In step S521, the data storage unit 305 of the CPS 160 stores the received access token.

In step S522, the communication unit 303 of the CPS 160 notifies the image forming apparatus 110 that the user has been authorized.

In step S523, the image forming apparatus 110 transmits the print job execution result of the printing performed in step S515 to the CPS 160.

In step S524, the communication unit 303 of the CPS 160 transmits the print job execution result to the CPS 170.

In step S525, the data storage unit 305 of the CPS 170 stores the print job execution result.

In step S526, the communication unit 303 of the CPS 170 notifies the CPS 160 that the print job execution result has been stored.

In step S527, the communication unit 303 of the CPS 160 notifies the image forming apparatus 110 that the print job execution result has been stored.

In this way, even in a case where the user prints an image file stored in the cloud storage service 190 by operating the image forming apparatus 110 in the shared office print, the print job execution result can be managed by the CPS 170 having the corresponding company tenant. Examples of the files stored in the cloud storage service 190 include document files and image files.

In a case where the user of the company A prints a document stored in the cloud storage service 190 by using the image forming apparatus 130 in the company A via the CPS 170, the CPS 170 can manage the print job execution result. Thus, both of the print job execution result obtained when the user of the company A prints a document by operating the image forming apparatus 130 in the office of the company A and the print job execution result obtained when the user of the company A prints a document by operating the image forming apparatus 110 outside the office of the company A (e.g., by using the image forming apparatus 110 in the shared office) are collectively manageable by the CPS 170. The information about these print job execution results are collectively manageable, thus enabling the CPS 170 to collectively perform billing for the printing and detailed examination of the logs of the documents printed by the user.

<Sequence of Automatic Determination of Destination of Print Job Execution Result>

Figure 6:
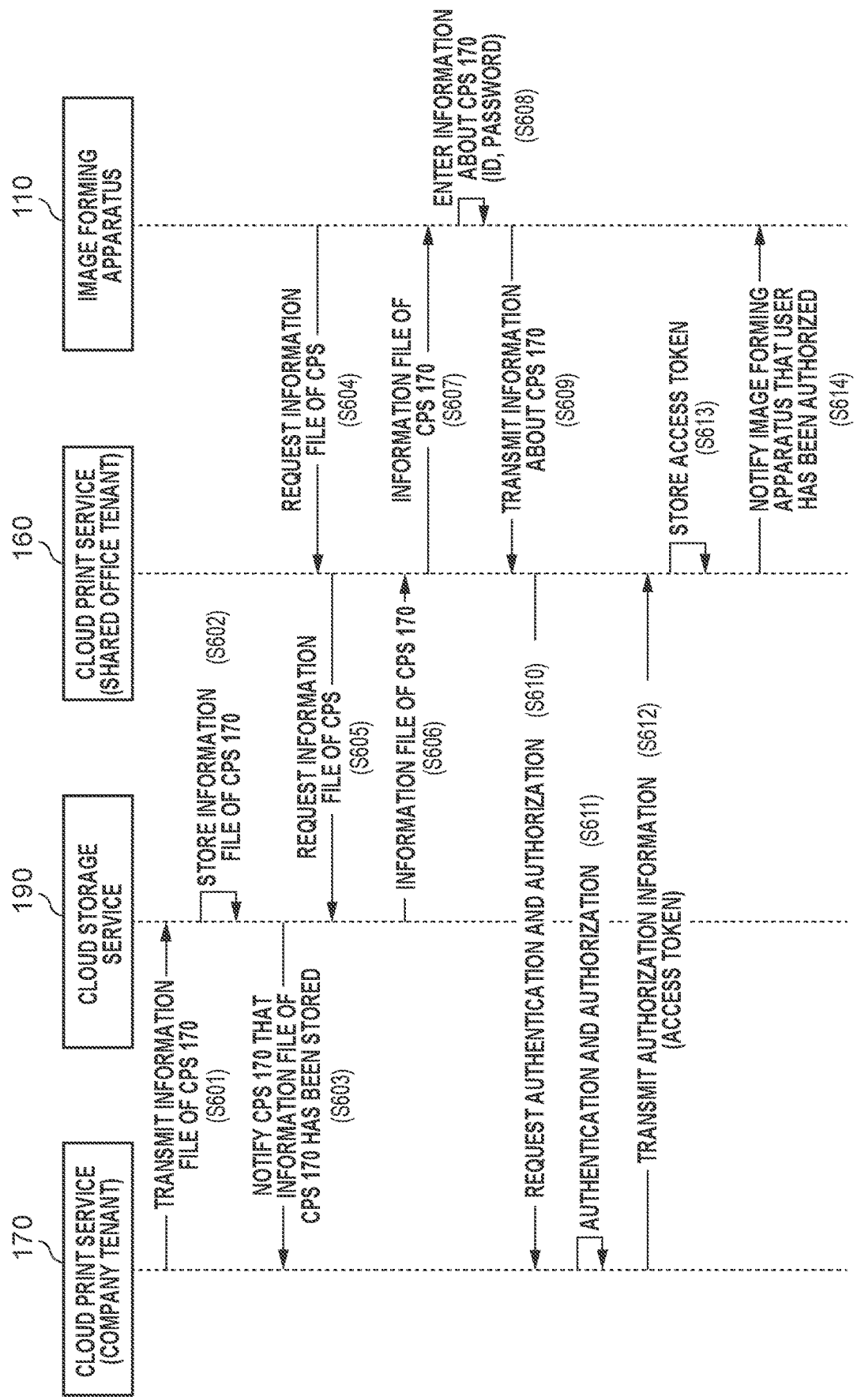
FIG. 6 is a sequence diagram illustrating automatic determination of a destination of a print job execution result.

In the above step S516, the user enters the information about the CPS to which the user wishes to transmit the print job execution result. Here, the user may be unaware of the need for entering the information about the CPS to transmit the print result and consequently skip the entering of the information about the CPS. FIG. 6 illustrates a sequence of processing for automatically determining the destination of the print job execution result and prompting the user to enter the information.

Figure 9:
FIG. 9 is a diagram illustrating an example of a cloud print service information file.

In step S601, the communication unit 303 of the CPS 170 transmits an information file of the CPS 170 to the cloud storage service 190. An example of the information file of the CPS 170 is an information file 900 as illustrated in FIG. 9. This information file 900 includes the tenant name and the tenant URL of the CPS 170.

In step S602, the data storage unit 1004 of the cloud storage service 190 stores the information file 900 of the CPS 170.

In step S603, the communication unit 1001 of the cloud storage service 190 notifies the CPS 170 that the information file 900 of the CPS 170 has been stored.

When the user operates the image forming apparatus 110 next, in step S604, the image forming apparatus 110 requests the information file of the CPS 170 from the CPS 160.

In step S605, the communication unit 303 of the CPS 160 requests the information file of the CPS 170 from the cloud storage service 190.

In step S606, the communication unit 1001 of the cloud storage service 190 transmits the information file 900 of the CPS 170 to the CPS 160.

In step S607, the communication unit 303 of the CPS 160 transmits the information file 900 of the CPS 170 to the image forming apparatus 110.

In step S608, in response to receiving the information file 900 of the CPS 170, the image forming apparatus 110 displays a UI 800 as illustrated in FIG. 8 for entering information about the CPS 170, and the user enters information about the CPS 170. In a case where the image forming apparatus 110 receives the information file 900, the UI 800 is automatically displayed and the tenant URL acquired from the information file 900 is automatically entered on the UI 800. This excludes possibility that the user will skip entering the information about the CPS 170.

In step S609, the image forming apparatus 110 transmits the information entered by the user in step S608 to the CPS 160.

In step S610, the communication unit 303 of the CPS 160 transmits the received information to the CPS 170.

In step S611, the authentication control unit 304 of the CPS 170 performs authentication and authorization processing based on the received information.

In step S612, if the authorization is successful, the communication unit 303 of the CPS 170 transmits authorization information (an access token) to the CPS 160.

In step S613, the data storage unit 305 of the CPS 160 stores the received access token.

In step S614, the communication unit 303 of the CPS 160 notifies the image forming apparatus 110 that the user has been authorized.

As described above, the destination of the print job execution result is automatically determined and the user is prompted to enter information about the CPS 170, thus ensuring that the user enters information about the CPS 170, and enabling the CPS 170 having the company tenant to manage the print job execution result.

(Other Exemplary Embodiments)

The present disclosure includes an apparatus, a system, or a method obtained by suitably combining the above exemplary embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-011483, filed Jan. 28, 2022, which is hereby incorporated by reference herein in its entirety.

What is claimed is:

1. An image forming apparatus configured to communicate with a first cloud cooperation system, the image forming apparatus comprising:
a printer;
at least one memory that stores instructions; and
at least one processor that executes the instructions to:
request the first cloud cooperation system to acquire a list of files stored in a cloud storage service which is different from the first cloud cooperation system;
receive, from the first cloud cooperation system, the list of files which is acquired from the cloud storage service by the first cloud cooperation system;
request the first cloud cooperation system to acquire a file which is selected from the received list by a user;

receive, from the first cloud cooperation system, the
selected file which is acquired from the cloud storage
service by the first cloud cooperation system;
print the received file;
receive input of authentication information to be used
for connection to a second cloud cooperation system
different from the first cloud cooperation system; and
transmit the input authentication information and information about a result of the printing to the first cloud
cooperation system for causing the first cloud cooperation system to transmit the result of the printing to
the second cloud cooperation system by using the
input authentication information.

2. The image forming apparatus according to claim 1, wherein, in a case where information indicating the second cloud cooperation system is stored as a transmission destination of the result of the printing in the cloud storage service, the image forming apparatus displays an input screen for inputting the authentication information to be used for connection to the second cloud cooperation system, with the information indicating the second cloud cooperation system set on the input screen, and receives the input of the authentication information to be used for connection to the second cloud cooperation system via the input screen.

3. A cloud system comprising:
a first cloud cooperation system configured to communicate with an image forming apparatus; and
a second cloud cooperation system different from the first cloud cooperation system,
wherein the first cloud cooperation system performs:
receiving, from the image forming apparatus, a first request for acquisition of a list of files stored in a cloud storage service which is different from the first cloud cooperation system;
acquiring the list of files stored in the cloud storage service;
transmitting the acquired list of files to the image forming apparatus;
receiving, from the image forming apparatus, a second request for acquisition of a file stored in a cloud storage service from which is selected from the list by a user of the image forming apparatus;
acquiring the file for which the received acquisition request is made from the cloud storage service;
transmitting the acquired file to the image forming apparatus;
receiving, from the image forming apparatus, authentication information to be used for connection to the second cloud cooperation system;
receiving information about a print result of the transmitted file from the image forming apparatus; and
transmitting the information about the print result to the second cloud cooperation system by using the authentication information to be used for connection to the second cloud cooperation system, and
wherein the second cloud cooperation system performs:
receiving the information about the print result from the first cloud cooperation system; and
managing the received information about the print result.

4. The cloud system according to claim 3, wherein the second cloud cooperation system transmits information indicating the second cloud cooperation system to the cloud storage service, and the cloud storage service stores the transmitted information indicating the second cloud cooperation system as a transmission destination of the result of the printing.

5. The cloud system according to claim 4, wherein, in a case where the information indicating the second cloud cooperation system is stored as the transmission destination of the result of the printing in the cloud storage service, the first cloud cooperation system transmits the acquired file and the information indicating the second cloud cooperation system to the image forming apparatus.

6. A control method for an image forming apparatus including a printer and configured to communicate with a first cloud cooperation system, the control method comprising:
requesting the first cloud cooperation system to acquire a list of files stored in a cloud storage service which is different from the first cloud cooperation system;
receiving, from the first cloud cooperation system, the list of files which is acquired from the cloud storage service by the first cloud cooperation system;
requesting the first cloud cooperation system to acquire a file which is selected from the received list by a user;
receiving, from the first cloud cooperation system, the selected file which is acquired from the cloud storage service by the first cloud cooperation system;
printing the received file;
receiving input of authentication information to be used for connection to a second cloud cooperation system different from the first cloud cooperation system; and
transmitting the input authentication information and information about a result of the printing to the first cloud cooperation system for causing the first cloud cooperation system to transmit the result of the printing to the second cloud cooperation system by using the input authentication information.

7. A control method for a cloud system including a first cloud cooperation system configured to communicate with an image forming apparatus, and a second cloud cooperation system different from the first cloud cooperation system, the control method comprising:
causing the first cloud cooperation system to receive, from the image forming apparatus, a first request for acquisition of a list of files stored in a cloud storage service which is different from the first cloud cooperation system;
causing the first cloud cooperation system to acquire the list of files stored in the cloud storage service;
causing the first cloud cooperation system to transmit the acquired list of files to the image forming apparatus;
causing the first cloud cooperation system to receive, from the image forming apparatus, a second request for acquisition of a file which is selected from the list by a user of the image forming apparatus;
causing the first cloud cooperation system to acquire the file for which the received acquisition request is made from the cloud storage service;
causing the first cloud cooperation system to transmit the acquired file to the image forming apparatus;
causing the first cloud cooperation system to receive, from the image forming apparatus, authentication information to be used for connection to the second cloud cooperation system;
causing the first cloud cooperation system to receive information about a print result of the transmitted file from the image forming apparatus;
causing the first cloud cooperation system to transmit the information about the print result to the second cloud cooperation system by using the authentication information to be used for connection to the second cloud cooperation system;

causing the second cloud cooperation system to receive the information about the print result from the first cloud cooperation system; and causing the second cloud cooperation system to manage the received information about the print result.

8. A non-transitory computer-readable storage medium that stores a program, wherein the program causes a processor of an information processing apparatus including a printer to perform:

requesting a first cloud cooperation system to acquire a list of files stored in a cloud storage service which is different from the first cloud cooperation system;

receiving, from the first cloud cooperation system, the list of files which is acquired from the cloud storage service by the first cloud cooperation system;

requesting the first cloud cooperation system to acquire a file which is selected from the received list by a user;

receiving, from the first cloud cooperation system, the selected file which is acquired from the cloud storage service by the first cloud cooperation system;

printing the received file;

receiving input of authentication information to be used for connection to a second cloud cooperation system different from the first cloud cooperation system; and transmitting the input authentication information and information about a result of the printing to the first cloud cooperation system for causing the first cloud cooperation system to transmit the result of the printing to the second cloud cooperation system by using the input authentication information.

* * * * *